Aug. 19, 1958   R. H. JOHNSON   2,848,288
PISTON RING
Filed Aug. 23, 1955   2 Sheets-Sheet 1
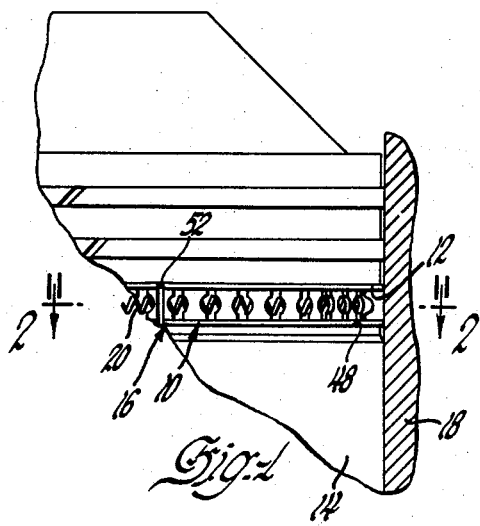
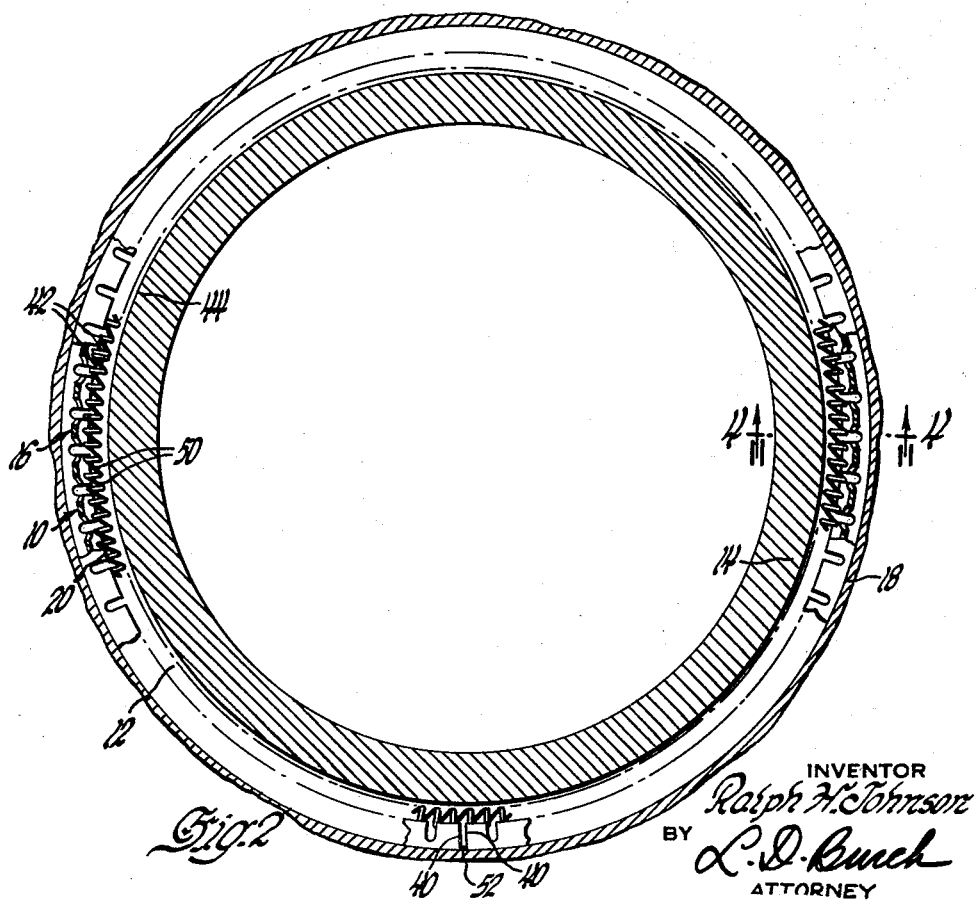
INVENTOR
Ralph H. Johnson
BY
L. D. Burch
ATTORNEY

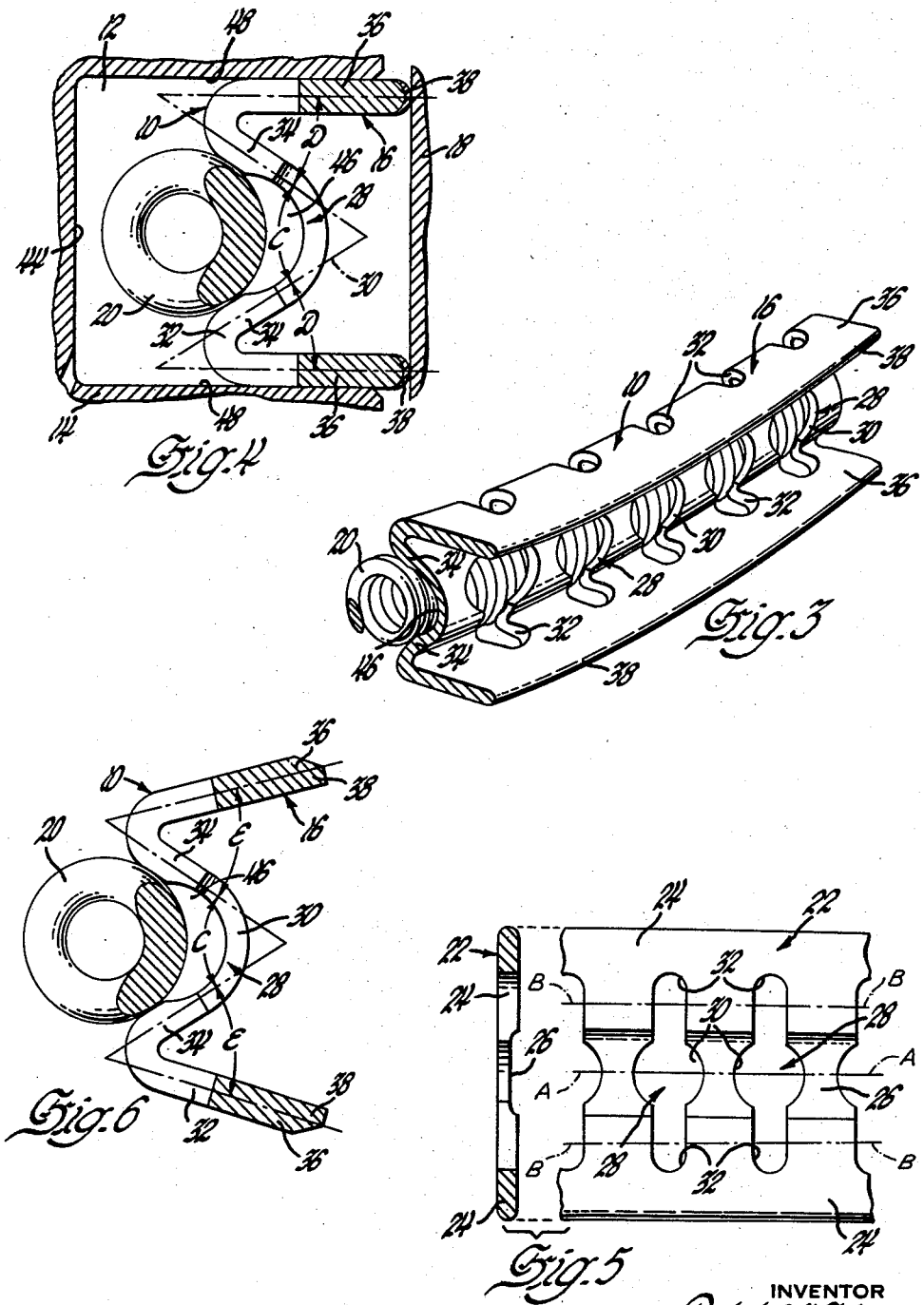

United States Patent Office 2,848,288
Patented Aug. 19, 1958

2,848,288

PISTON RING

Ralph H. Johnson, Detroit, Mich., assignor to General Motors Corporation, Detroit, Mich., a corporation of Delaware Application August 23, 1955, Serial No. 530,096

6 Claims. (Cl. 309—24)

This invention relates to piston rings, and more particularly to oil control piston rings of the sheet metal type.

It is the prevalent practice, at least in the case of gasoline internal combustion engines, to employ two compression rings and an oil control ring for each piston. One purpose of the oil ring is to scrape oil from the cylinder walls in excess of that required to lubricate the same and to return the excess oil to the crankcase through passages extending radially through the oil ring and the walls of the piston.

Although it is not always fully understood by those skilled in the art how an oil control ring should be made in order to meter only the very small amount of oil needed to sufficiently lubricate the cylinder walls and to return all of the excess oil to the crankcase so that it cannot work its way into and foul the combustion chamber, certain requirements for oil rings have been definitely established.

For instance, such rings should be inexpensive to manufacture, easy to assemble and replace, and light in weight to prevent noise and wear of the ring and the ring groove. Also, they should bear against the cylinder walls with sufficient force, even when the cylinder walls are worn or the ring groove has been reconditioned, to scrape the right amount of oil, and they should have sufficient openings therethrough to carry the scraped oil away from the cylinder walls. The openings should be of such a character that they will not become clogged with carbon or other material so that the oil cannot pass. Furthermore, as a result of the development of modern high compression ratio engines, it has been determined that such rings should bear against the sides of the ring groove in order to prevent high vacuum pumping of lubricating oil around the back of the rings.

Research and development over a period of years aimed at providing oil rings having the above characteristics has resulted in the gradual replacement of the earlier heavy, rigid one-piece cast iron oil ring by lighter, flexible four-piece, three-piece or even two-piece sheet metal rings. The four-piece rings usually comprise a pair of thin rails spaced at the sides of the ring groove by a channel-shaped or a corrugated spacer and urged against the cylinder walls by a hump-type expander. The three-piece rings are generally provided with a combined spacer and expander, while the two-piece rings combine the rails and the spacer and require a separate expander.

While some of the sheet metal rings presently known are light in weight and possessed of some of the above requirements of a good oil ring, they often lack one or more of these requirements. For instance, some of these rings are of such intricate design that they are expensive and difficult to make. Others have too many pieces so that they must be stuck together to facilitate their handling and installation; sometimes they come apart before they are installed. Still others cannot be stuck together so that they are again difficult to handle and install. Other objections are that the expanders of some rings must engage the bottom of the ring groove in providing radial force, some rings do not bear against the sides of the ring groove to prevent pumping of oil behind the rings and some rings do not have continuous oil scraping edges. Still other objections are that the rings bear against the cylinder walls with too much pressure so that they do not meter a sufficient amount of oil, thus causing wear of the cylinder walls and the rings.

It is believed that a single oil ring having all of the above requirements and none of the above objections to various oil rings already known has not yet been developed, and it is an object of the present invention to provide such a ring.

Other objects and advantages of a ring embodying the invention will become apparent from the following description taken in connection with the accompanying drawings, in which:

Figure 1 is a fragmentary side elevational view of a piston having an oil ring embodying the invention and engaging the wall of a cylinder shown in cross-section.

Figure 2 is a fragmentary cross-sectional view taken on the plane of line 2—2 of Figure 1 and looking in the direction of the arrows.

Figure 3 is an enlarged fragmentary perspective view of the oil ring shown by Figures 1 and 2.

Figure 4 is a still further enlarged cross-sectional view taken on the plane of line 4—4 of Figure 2 and looking in the direction of the arrows.

Figure 5 is a combined fragmentary plan view and a cross-sectional view of a blank from which the ring shown by Figures 1–4 may be formed.

Figure 6 is a view similar to Figure 4 illustrating what may be a modified form of the ring in the free position.

Referring to the drawings in greater detail, an oil ring 10 embodying the invention and adapted to be inserted into the oil ring groove 12 of the piston 14 comprises an outer annular member 16 for engaging the cylinder wall 18 and an inner annular spring member 20 to expand the member 16 radially and axially.

The outer member 10 may be made by longitudinally folding a continuous blank 22 preformed to provide longitudinally extending thicker side portions 24 and a thinner connecting central portion 26 and transversely extending slots 28 having enlarged central openings 30 and elongated narrower end openings 32 connecting with the central openings 30. In the particular blank shown, the central openings 30 are confined within the thinner portion 26, and the narrower end openings 32 extend into the thicker portions 24. It should be understood, however, that the particular shapes of the slots may be varied as desired, so long as the functional characteristics thereof to be described are provided.

It will be noted that the blank 22 is folded in one direction along the line A—A extending centrally of the thinner portion 26 and across the central openings 30 and in the opposite direction along the lines B—B extending along the thicker portions 24 and across the narrower openings 32. The result of the folding of the blank 22 in the preferred manner is a structure having a generally M-shaped cross-section such as the member 16 shown by Figures 3–5.

In Figure 4, the angle C between the inner arms or webs 34 is approximately 60°, and the angles D between each outer arm or flange 36 and the connecting inner arm 34 is approximately 30°. These angles may be varied, depending upon the result desired. For instance, the angle E in Figure 6 exceeds 30° for a purpose which will be described later.

The continuous folded blank 22 may then be coiled and cut off in proper lengths, or vice versa, to provide annular rings 16 such as that shown by Figures 1–3 having the outer flanges 36 thereof extending outwardly to provide cylinder-engaging edges 38. The edges 38 may be uniformly curved as shown by Figure 4 or otherwise formed as shown by Figure 5. Also, these edges may or may not be chrome-plated or otherwise treated as shown by Figure 4. The rings 16 are of such length, however, that when compressed in the oil ring groove 12 and inserted into the cylinder 18 the ends 40 thereof do not abut.

The oil ring 10 also includes an inner expander member 20, which in the preferred form of oil ring comprises a coil spring of such length that when compressed in the oil ring groove 12 behind the outer annular member 16 the ends 42 thereof do abut to provide a circumferentially expansible and compressible structure which does not engage the bottom 44 of the ring groove when positioned concentric therewith. It should be apparent that the inner member 20 need not necessarily be a coil spring, if a circumferentially acting member having an outer periphery of suitable shape is provided.

An endless expander of non-metallic resilient material such as rubber or other similar material could also be employed in the place of a circumferentially compressible structure.

A ring constructed according to the invention may be assembled in the oil ring groove 12 by first inserting the inner spring member 20 into the ring groove so that the ends 42 thereof are in abutting relation. The insertion of the member 20 may be facilitated by the preformation thereof into a ring so that its normal free position is annular rather than straight. The outer member 16 is then inserted into the groove 12 around the inner member 20, as shown by Figure 4, so that the spring 20 naturally positions itself in the recess 46 between the inner arms or webs 34 of the member 16.

When a piston 14 having an oil ring embodying the invention is inserted into a cylinder, the edges 38 engage the cylinder wall 18 and compress the outer ring 16 to the diameter of the cylinder. The inner spring member 20 is thus circumferentially compressed, and the resistance thereof to such compression produces an evenly distributed radial pressure along the inner periphery of the outer ring member 16.

It will be noted that the recess 46 between the inner arms 34 produced by folding the blank 22 along the line A—A is too narrow to receive the entire spring member 20, the result being that the inner arms 34 engage the inner spring member 20 tangentially and also cause a widening of the recess 46 or an axial separation of the inner arms 34. This spreading of the arms 34 forces the outer arms or flanges 36 of the member 16 against the side walls 48 of the piston ring groove 12. This axial or side loading maintains contact between the ring 16 and the side walls 48 of the groove 12 at all times during operation of the engine, and it prevents pumping of oil in either direction around the back of the ring 16.

The intensity of the side loading of the ring 16 will depend upon the various features of construction of the ring assembly 10 such as thickness and spring quality of the material from which member 16 is made, the size and shape of the slots 28 and the size and strength of the inner spring 20. It is apparent that the provision of a thinner central portion 26 and the enlarged central openings 30 provides increased axial flexibility of the member 16 and reduces the strength required in spring 20 to cause axial spreading of the arms 34. Side loading may also be provided or increased by the extent to which the flanges 36 of member 16 are divergent in the free position thereof, as shown by Figure 5, so that the flanges are compressed to approach a position of parallelism when inserted into the ring groove 12, as shown by Figure 4. In such case, the expander 20 may prevent the coming together of the inner arms 34 and thus prevent the loss of side loading due to the original divergence of flanges 36. One of the flanges 36 may be more divergent with respect to its connected inner arm 34 than the other flange 36 if the operation of the particular engine involved indicates that this would be desirable.

Since the load distributed along the side of the ring groove 12 may be varied by adjusting the angle between adjacent arms 34 and 36 for a given expander pressure, it follows that when the pressure of the expander is varied, the above angle may have to be varied to achieve the proper side pressure distribution. However, since the expander 20 supplies a greater part of the side load, the variation or control over the angle between arms 34 and 36 is not too critical, and the manufacturing limits customarily maintained in piston ring manufacture would hold this angle close enough for proper operation. By varying this angle, the intensity of the side load for a given expander spring load may be varied, and this provides another method of changing the side load for a given expander load. Also, as already stated above, this angle may be varied on one side of the member 16 with respect to the other side if engine operation showed that this would be of value.

The reduced section 26 is one of the important features of applicant's ring where ring 16 is made of relatively stiff material, since the expander 20 will not have a sufficient side load effect unless the structure of the ring 16 is sufficiently flexible to allow the ring to expand axially. If member 16 is made of a softer spring material the reduced section 26 may not be required. The amount of flexibility in the axial direction is controlled in large part by the reduced section 26, the angle between the arms 34 and between the arms 34 and 36, the slots 28 and the load of expander 20. To cause a stiff ring 16 to expand axially without the reduced section 26 would require higher load from the expander 20 which may result in excessive engine friction. Since the ring assembly 10 is very light, the effect of inertia due to change in direction of the piston and the resultant wear of the ring and ring groove, are reduced to a minimum As the piston travels along the cylinder, the ring 16 and the expander 20 flex in all directions to maintain constant contact with the cylinder walls 18 and the sides 48 of the ring groove 12. This flexing tends to dislodge carbon and other matter which would close the oil drain passages provided by the slots 28 and the spaces 50 between the coils of the expander 20.

The spring rate of the expander 20 may be varied to produce the desired pressure of the edges 38 on the cylinder walls 18 so that only the minimum amount of lubricating oil is metered past the oil ring 10, the remainder of the oil being scraped and returned to the oil reservoir. The oil scraping edges 38 are continuous around the ring 16 to the ring gap 52 and from the cylinder wall 18 to a line radially within the outer peripheral surface of the piston so that oil cannot pass through these edges.

In brief summary, it is apparent that unit load of the ring assembly 10 may be varied by varying the rate of the expander 20. The reduced section 26 at the middle of the member 16 allows the arms or flanges 36 to expand against sides 48 of the groove, to provide side seal. The notched flanges 36 provide good conformability to the cylinder bore, yet they provide a complete seal for high vacuum oil control. Light weight insures low inertia and improves ability to follow bore at high speeds. The angle between arms 34 and flanges 36 may be varied in the free position to provide side contact when installed and also to insure that the flanges 36 will be reasonably parallel to the sides 48 of the groove 12. One-piece construction, except for expander 20, facilitates assembly on the piston 14.

It is believed, as originally stated, that the proposed piston ring structure has all of the known requirements for an oil ring and none of the objections to oil rings presently known.

What is claimed is:

1. A piston ring comprising an annular cylinder engaging member including a pair of continuous and axially spaced and circumferentially extending flanges having circumferentially spaced web members extending radially inwardly from said flanges and connecting said flanges, said circumferentially spaced web members being formed adjacent said flanges to provide support means and between said support means being formed to provide resilient connecting means, said web members at said resilient connecting means being more resilient than elsewhere throughout the extent of said web members.

2. A piston ring as defined by claim 1 and in which circumferentially expansible means is employed inwardly of said cylinder engaging member and is engaged and radially compressed by said support means, said web members at said resilient connecting means being spaced from said circumferentially expansible means.

3. A piston ring as defined by claim 1 and in which the radial thickness of said web member is greater at said support means and adjacent said flanges than at said resilient connecting means.

4. A piston ring as defined by claim 1 and in which said web members are circumferentially spaced at said resilient connecting means to a greater extent than at said support means and adjacent said flanges.

5. A piston ring comprising an annular cylinder engaging member including a pair of continuous and axially spaced and circumferentially extending flanges having circumferentially spaced web members extending radially inwardly from said flanges and integrally connecting said flanges, said circumferentially spaced web members being formed to provide radially outwardly converging and obliquely oppositely disposed supporting surface means and being formed between said supporting surface means to provide resilient connecting means, said web members at said resilient connecting means being more resilient than alsewhere throughout the extent of said web members.

6. A piston ring comprising an annular cylinder engaging member including a pair of continuous and axially spaced and circumferentially extending flanges having web members extending radially inwardly from said flanges and integrally connecting said flanges, said web members being formed to provide radially outwardly converging and obliquely and oppositely disposed support means and being formed between said support means to provide resilient connecting means, said resilient connecting means and said support means being formed to provide an annular depression extending circumferentially around the inner surface of said cylinder engaging member, said depression having a width which is greater at the inner edges of said support means than elsewhere throughout said depression, said web members at said resilient connecting means being substantially more resilient at said resilient connecting means than elsewhere throughout said web members.

References Cited in the file of this patent

UNITED STATES PATENTS

| | | |
|---|---|---|
| 2,229,578 | Malpas | Jan. 21, 1941 |
| 2,280,743 | Bowers | Apr. 21, 1942 |
| 2,439,702 | Teetor | Apr. 13, 1948 |
| 2,452,503 | Teetor | Oct. 26, 1948 |
| 2,631,908 | Teetor | Mar. 17, 1953 |
| 2,642,323 | Duesenberg | June 16, 1953 |